United States Patent [19]
Markusch et al.

[11] Patent Number: 6,152,981
[45] Date of Patent: Nov. 28, 2000

[54] SULFUR CONTAINING ISOCYANATE COMPOSITIONS

[75] Inventors: Peter H. Markusch, McMurray, Pa.; Donald MacNaughtan, Jr., New Martinsville, W. Va.; William G. Crabtree, Wheeling, W. Va.; Robert L. Cline, Paden City, W. Va.

[73] Assignee: Bayer Corporation, Pittsburgh, Pa.

[21] Appl. No.: 09/255,285

[22] Filed: Feb. 22, 1999

Related U.S. Application Data

[63] Continuation of application No. 09/121,374, Jul. 23, 1998.
[51] Int. Cl.$^7$ .......................... A01N 25/00; A01N 27/00; A01N 31/00
[52] U.S. Cl. .................. 71/1; 71/31; 71/64.07; 71/64.011; 71/64.13
[58] Field of Search .................... 71/28, 64.07, 64.11, 71/64.13, 27, 31, 1; 521/155–177, 130, 132, 120; 528/44–85; 544/68; 504/100; 106/638, 802, 803, 809, 811

[56] References Cited

U.S. PATENT DOCUMENTS

| | | | |
|---|---|---|---|
| 3,259,482 | 7/1966 | Hansen | 71/64 |
| 3,264,088 | 8/1966 | Hansen | 71/64 |
| 3,264,089 | 8/1966 | Hansen | 71/64 |
| 3,342,577 | 9/1967 | Blouin et al. | 71/3 |
| 3,475,154 | 10/1969 | Kato | 71/64 |
| 3,876,568 | 4/1975 | Wysocki | 521/170 |
| 3,920,436 | 11/1975 | Janssen | 501/100 |
| 4,369,055 | 1/1983 | Fujita et al. | 71/64.11 |
| 4,412,072 | 10/1983 | Kamatani et al. | 544/68 |
| 4,711,659 | 12/1987 | Moore | 71/93 |
| 4,772,490 | 9/1988 | Kögler et al. | 427/212 |
| 4,804,403 | 2/1989 | Moore | 71/28 |
| 4,969,947 | 11/1990 | Moore | 71/28 |
| 5,219,465 | 6/1993 | Goetz et al. | 71/28 |
| 5,374,292 | 12/1994 | Detrick et al. | 71/28 |
| 5,451,615 | 9/1995 | Birch | 521/132 |
| 5,538,531 | 7/1996 | Hudson et al. | 71/28 |
| 5,547,486 | 8/1996 | Detrick et al. | 71/28 |
| 5,599,374 | 2/1997 | Detrick | 71/28 |
| 5,645,624 | 7/1997 | Naka et al. | 71/64.07 |

FOREIGN PATENT DOCUMENTS

| | | |
|---|---|---|
| 52-38361 | 3/1977 | Japan . |
| 2088394 | 6/1982 | United Kingdom . |

OTHER PUBLICATIONS

Sulfur Solubility in Pure & Mixed Organic Solvents, Ind. Eng. Chem. (month unavailable) pp. 485–491.
"Solubility of Elemental Sulfur in a Number of Organic Solvents", by G.S. Frolov, V.I. Lazerev, I.S. Antsypovich and T.V. Epishkina translated from Zhurnal Prikladnoi Khimii, vol. 48, No. 8, pp. 1853–1855, Aug. 1975, Original article submitted Oct. 14, 1974.

*Primary Examiner*—Steven P. Griffin
*Assistant Examiner*—Eileen E. Nave
*Attorney, Agent, or Firm*—Joseph C. Gil; N. Denise Brown

[57] ABSTRACT

This invention relates to an isocyanate composition comprising a) at least one isocyanate and b) from 1 to 50% by weight, based on the total weight of component a), of sulfur. These isocyanate compositions are suitable for the preparation of polyurethane/polyurea encapsulated fertilizers. Accordingly, the present invention also relates to an improved process for the production of a polyurea/polyurethane encapsulated fertilizer comprising applying at least one isocyanate-reactive component to the fertilizer particles and applying the isocyanate compositions of the present invention to the fertilizer particles, to form these polyurea/polyurethane encapsulated fertilizers.

12 Claims, 2 Drawing Sheets

SULFUR CONTAINING ISOCYANATE COMPOSITIONS

This application is a continuation of Ser. No. 09/121,374, filed Jul. 23, 1998.

BACKGROUND OF THE INVENTION

The present invention relates to isocyanate compositions comprising a) at least one isocyanate and b) sulfur. The present invention also relates to a process of dissolving sulfur in an isocyanate, reacting the isocyanate with suitable co-reactants to form polyurethanes and/or polyureas and polyurethanes and/or polyureas containing finely divided sulfur particles embedded in the polymer matrix. This invention also relates to a process for producing encapsulated fertilizers comprising applying A) at least one coat of an isocyanate-reactive component to fertilizer particles, and applying at least one coat of the present isocyanate compositions to fertilizer particles, thus forming sulfur containing polyurethane encapsulated fertilizer particles; B) premixing sulfur containing isocyanate and an isocyanate-reactive compound prior to applying it; C) applying first the sulfur containing isocyanate followed by applying the isocyanate-reactive compound; and D) applying the sulfur containing isocyanate compound and using humidity or water to form a sulfur containing organic polyurea or polyurethane/polyurea. The present invention also relates to the encapsulated fertilizers produced by these processes.

Elementary sulfur is used in many applications, i.e., as a vulcanizing agent in the rubber industry, as a component in the preparation of thiokols (organic polysulfides used, i.e., as sealants, adhesives, impregnation agents and insulation materials), as part of match making compositions, as a raw material for black powder production (mixture of sulfur, charcoal and potassium nitrate). Sulfur has also been used to encapsulate fertilizers to control the release of plant nutrients. In this case, the sulfur is applied to the fertilizer particles in either a molten form or dispersed in an organic liquid.

In many of these applications, it would be desirable to use sulfur in a diluted form either as a solution in a liquid organic compound or in form of very finely divided, homogeneously dispersed particles.

Elementary sulfur is insoluble in water and almost all liquid organic compounds such as, for example, alcohols, esters, ethers, ketones, etc, except for some organic compounds that have sulfur already chemically bonded to the organic molecules, i.e., $CS_2$ (carbon disulfide) and certain thiols, alkyl sulfides, sulfoxides, sulfones and sulfonic acids. (See Basic Principles of Organic Chemistry, John D. Roberts and Majorie C. Caserio, Published by W. A. Benjamin, Inc., 1965, New York, Amsterdam; Sulfur Solubility in Pure and Mixed Organic Solvents, Ind. Eng. Chem. Res., 1988, 27, pp. 485–491; and "Solubility of Elemental Sulfur in a Number of Organic Solvents" by G. S. Frolov, V. I. Lazarev, I. S. Antsypovich and T. V. Epishkina translated from Zhurnal Prikladnoi Khimii, Vol. 48, No. 8, pp.1853–1855, August, 1975, Original Article submitted Oct. 14, 1974.

Commercial particulate fertilizers are produced and marketed in several different particle types, i.e., granular, pelletized, dusts, pilled, and prilled fertilizers. Also, they may be formed of inorganic substances, organic substances, or combinations thereof. The isocyanate compositions of the present invention can be applied to any of these types of particulate fertilizers.

In order to be effective in promoting plant growth, fertilizers must contain some amount of water soluble plant nutrients. These are typically in the form of water soluble compounds of nitrogen, phosphorus and potassium, alone or in combination, and often in conjunction with other elements such as, for example, calcium, boron, magnesium, zinc, chlorine, etc. Such particular fertilizers can be made of a single component, e.g., urea, ammonium nitrate, potassium chloride, etc., or of multiple components often mixed with inert water soluble or water insoluble materials as in common fertilizers designated as 6-6-6, 4-6-4, 10-10-10, 20-20-5, 14-16-0, 5-20-20, and the like. In addition, specialized fertilizers may contain optional additives such as herbicides, insecticides, trace elements, iron salts, sulfur, etc. The isocyanate compositions of the present invention can be applied to any of these fertilizers.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are well documented in previous patents that professed solutions to one or more of the known defects, including U.S. Pat. Nos. 3,475,154, 3,259,482, 3,264,088, 3,264,089, 4,711,659, 4,772,490 and Japanese Patent 52-38361.

A number of slow release coatings for particulate fertilizers have previously been proposed. One of the methods to achieve slower release of the fertilizer has been the application of liquid sulfur which is usually done in a rotating horizontal drum. The fertilizer is usually preheated to the granules. However, when the sulfur comes in contact with the fertilizer granules, it solidifies rapidly and thus, is deposited in the form of chunks and flakes on the fertilizer surface. Although the release of nutrients is slowed down by using this treatment, the fertilizer is only partially encapsulated and the sulfur is inherently brittle and does not provide the necessary abrasion resistance and protection when these sulfur coated fertilizers are packaged, transported and, finally, applied by a spreader. Thus, a lot of the sulfur may have already delaminated from the fertilizer particle and the slow release properties are further diminished. The process of sulfur coating urea particles is described in U.S. Pat. No. 3,342,577 and was developed in the late 1960's by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then, imperfections remain in the coating, making it necessary to apply a sealant coating, which, for example, can be composed of a mixture of 30% polyethylene resin in a 70% bright stock mineral oil.

Coatings in which preformed polymer resins are applied from solvents have been described in, for example, U.S. Pat. Nos. 3,475,154 and 3,264,089. The use of solvents creates a vapor hazard and environmental problem as the products are dried and the solvent evaporation step can result in pinhole imperfections in the coatings when applied.

U.S. Pat. No. 4,369,055 tried to facilitate degradation of coating materials while maintaining the function for controlling the dissolving-out rate by dispersing inorganic powders such as sulfur and talc in a low molecular weight olefin polymer. However, the disclosed coating materials do not provide good attrition resistance and are not completely degraded and thus remain intact in the soil.

Polyurethane coatings as disclosed in U.S. Pat. Nos. 4,711,659 and 4,969,947 require that the substrate contains a minimum quantity of reactive $—NH_2$ groups. Thus, these are not applicable to all fertilizer compositions for which slow release properties may be desirable.

U.S. Pat. No. 5,538,531 also describes controlled release fertilizers and a method for their production. These controlled release fertilizers have a central mass of particulate fertilizer which contains at least one water soluble plant nutrient surrounded by a plurality of coatings. The inner coating comprises the reaction product of (A) an aromatic polyisocyanate or derivatives thereof which contain about 1.5 to 3 NCO groups per molecule and an NCO group content of 10 to 50% by weight, and (B) a polyol having from 2 to 6 hydroxyl moieties and at least one alkyl moiety containing from about 10 to 22 carbon atoms. An outer coating is also necessary. The outer coating consists essentially of an organic wax having a drop melting point of between 50 and 120° C. The encapsulated fertilizers of U.S. Pat. No. 5,538,531 do not, however, contain sulfur in any form.

U.S. Pat. No. 5,645,624 describes an encapsulated fertilizer using first a layer of rapidly biodegradable aliphatic polyester and polyurethane compound followed by a slowly biodegradable layer based on cellulose derivatives and hydrocarbon compound to control the release rate of the fertilizer.

Advantages of the present invention include the fact that the isocyanate compositions of the present invention provide an improvement in the production of particulate fertilizers by allowing the sulfur to be distributed homogeneously onto the surface of the fertilizer particles, instead of being deposited as large, irregular chunks on the surface of the fertilizer particles. Upon reaction of the sulfur containing liquid polyisocyanate with a suitable Zerewitinoff active hydrogen containing compound (organic compounds containing —OH, —NH, —NH$_2$ or —SH groups) solid polyurethanes and/or polyureas are formed that contain sulfur in an evenly distributed, finely divided form throughout the polymer matrix.

SUMMARY OF THE INVENTION

This invention relates to an isocyanate composition comprising:
  a) at least one isocyanate, and
  b) from 1 to 50% by weight, based on the total weight of component a), of sulfur.

The present invention also relates to isocyanate compositions wherein the isocyanate and the sulfur form a solution containing from 1 to 20% by weight of sulfur, based on the total weight of isocyanate.

This invention also relates to a process of dissolving sulfur in an isocyanate, reacting the isocyanate with suitable co-reactants to form polyurethanes and/or polyureas containing finely divided sulfur particles embedded in the polymer matrix.

Another aspect of the present invention relates to a process for the production of polyurethane and/or polyurea encapsulated fertilizer particles. This process comprises 1) applying a) an isocyanate-reactive component which contains at least two isocyanate-reactive groups to fertilizer particles to form coated fertilizer particles; and 2) applying b) the sulfur containing polyisocyanate component of the present invention onto these coated fertilizer particles from step 1) to form polyurethane and/or polyurea encapsulated fertilizer particles. These two steps are optionally repeated (successively) as many times as necessary, with the polyurethane and/or polyurea encapsulated fertilizer particles from step 2) being substituted for the fertilizer particles in step 1), until the desired thickness of the polyurethane and/or polyurea coating which encapsulates the fertilizer particles is obtained. The resultant polyurethane and/or polyurea encapsulated fertilizer particles contain from about 2 to about 20%, preferably from about 3 to about 15%, and most preferably from about 4 to about 10% by weight of polyurethane and/or polyurea, based on the total weight of the encapsulated fertilizer composition.

Other aspects of the present invention include a process for producing encapsulated fertilizers comprising premixing sulfur containing isocyanate and an isocyanate-reactive compound prior to applying the resultant mixture to fertilizer particles; a process for producing encapsulated fertilizers comprising first applying the sulfur containing isocyanate compound to fertilizer particles, followed by applying the isocyanate-reactive compound to these coated fertilizer particles; and a process for producing encapsulated fertilizers comprising applying the sulfur containing isocyanate compound to fertilizer particles, and applying water or exposing to humidity to form a sulfur containing organic polyurea or polyurethane/polyurea. The application step(s) is/are optionally repeated (successively where two steps are involved) as many times as necessary, with the coated fertilizer particles being substituted for the fertilizer particles in step 1), until the desired thickness of the polyurethane and/or polyurea coating which encapsulates the fertilizer particles is obtained. The resultant polyurethane and/or polyurea encapsulated fertilizer particles contain from about 2 to about 20%, preferably from about 3 to about 15%, and most preferably from about 4 to about 10% by weight of polyurethane and/or polyurea, based on the total weight of the encapsulated fertilizer composition.

In the present invention, it is preferred that the component which is first applied to the fertilizer particles is present as a liquid component. However, when the isocyanate-reactive component is applied to the particles subsequently to the isocyanate component to form the polymer, it may be present as a gaseous component, i.e., water vapor.

Another embodiment of the present invention comprises 1) applying a sulfur containing polyisocyanate composition to fertilizer particles to form isocyanate coated fertilizer particles; and 2) applying an isocyanate-reactive component which contains at least two isocyanate-reactive groups onto the isocyanate coated fertilizer particles from step 1) to form polyurethane and/or polyurea encapsulated fertilizer particles. In this embodiment, the isocyanate-reactive component which contains amine groups is preferably present as a gaseous component. Such a gaseous component can be applied by contacting the fertilizer particles with the volatilized amine group containing component such as, for example, ethylene diamine. These two steps are optionally repeated (successively) as many times as necessary, with the polyurethane and/or polyurea encapsulated fertilizer particles from step 2) being substituted for the fertilizer particles in step 1), until the desired thickness of the polyurethane and/or polyurea coating which encapsulates the fertilizer particles is obtained. The resultant encapsulated fertilizer particles contain from about 2 to about 20%, preferably from about 3 to about 15%, and most preferably from about 4 to about 10% by weight of polyurethane and/or polyurea, based on the total weight of the encapsulated fertilizer composition.

In another embodiment of the present invention, this process comprises 1) sparsely applying water to fertilizer particles to form water coated fertilizer particles, immediately followed by 2) applying a sulfur containing polyisocyanate composition onto the water coated fertilizer particles from step 1), thereby forming polyurea encapsulated fertilizer particles. In this embodiment, the water may be present as a liquid component or as a gaseous component. When present as a gaseous component, the water is applied to the fertilizer particles by contacting the particles with steam. These two steps are optionally repeated (successively) as many times as necessary to form the desired thickness of polyurea coating which encapsulates the fertilizer particles. The resultant encapsulated fertilizer particles contain about 2 to about 20%, preferably from about 3 to about 15, and most preferably from about 4 to about 10% by weight of polyurea, based on the total weight of the encapsulated fertilizer composition.

The present invention is also directed to a process comprising 1) applying b) the polyisocyanate composition of the present invention onto fertilizer particles to form isocyanate coated fertilizer particles, immediately followed by 2) sparsely applying a) water onto the isocyanate coated fertilizer particles from step 1), thereby forming polyurea encapsulated fertilizer particles. In this embodiment, the water may be present as a liquid component or as a gaseous component. When present as a gaseous component, the water is applied to the fertilizer particles by contacting the particles with steam. These two steps are optionally repeated (successively) as many times as necessary to form the desired thickness of polyurea coating which encapsulates the fertilizer particles.

The resultant encapsulated fertilizer particles contain from about 2 to about 20%, preferably 3 to about 15%, and most preferably 4 to about 10% by weight of polyurea, based on the total weight of the polyurea encapsulated fertilizer particles.

In the present invention, it is possible that the fertilizer particles are encapsulated with layers of different polyurethanes and/or polyureas. Some of the individual layers may not contain sulfur at all. Different layers of encapsulating polyurethanes and/or polyureas can be applied to fertilizer particles by following one of the processes as described above in which the isocyanate or the isocyanate-reactive component is applied first, and the isocyanate-reactive or the isocyanate component, respectively, is applied to the pre-coated fertilizer particles, to form a polyurethane and/or polyurea encapsulating layer. The composition of the polyurethane and/or polyurea encapsulating layer is altered by the selection of the isocyanate component and the isocyanate-reactive component used to form each layer. By proper selection of the respective components for each layer, it is possible, for example, to produce encapsulated fertilizer particles having a first layer of polyurethane, followed by a second layer of polyurethane/- polyurea, followed by a third layer of polyurea, a fourth layer of polyurethane, etc. Thus, some of these layers may not contain finely dispersed sulfur. Of course, at least one layer of encapsulating material must be derived from a sulfur containing isocyanate component as described herein. Overall, the sum of the encapsulating layers should contain at least 1% by weight, preferably at least 3% by weight and most preferably at least 4% by weight of sulfur, based on 100% by weight of the encapsulating layers.

DETAILED DESCRIPTION OF THE INVENTION

Figure 1:
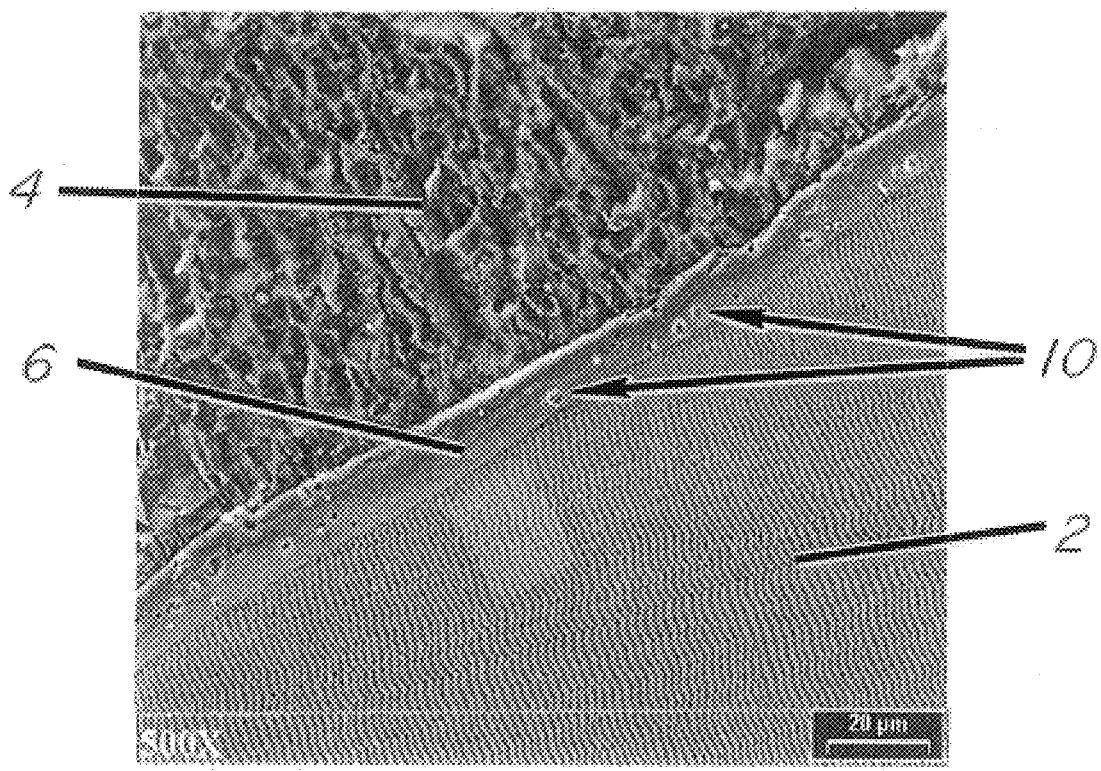
FIG. 1 is a scanning electron micrograph (500 magnification) of a cross-sectional view of an encapsulated fertilizer particle produced in accordance with the present invention which was embedded in an epoxy resin matrix.

Suitable polyisocyanates which may be used in forming the isocyanate compositions in accordance with the present invention include monomeric diisocyanates, NCO prepolymers, and preferably liquid polyisocyanates and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1, 4-tetramethylene diisocyanate, 1,6-hexamethylene diisocyanate, 2,2, 4-trimethyl-1,6-hexamethylene diisocyanate, 1,1 2-dodecamethylene diisocyanate, cyclohexane-1,3- and -1 ,4-diisocyanate, 1-isocyanato-2-isocyanatomethyl cyclopentane, 1 -isocyanato-3-isocyanatomethyl-3,5, 5-trimethyl-cyclohexane (isophorone diisocyanate or IPDI), bis(4-isocya natocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, ααα'α'-tetramethyl-1,3- and/or -1,4-xylylene diisocyanate,1 -isocyanato-1 -methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly (phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct, preferably a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 5 3,358,010; 3,644,490; 3,862, 973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 28% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552, 350.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 5,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic polyisocyanates are 1,3- and/or 1,4-phenylene diisocyanate, 2,4- and/or 2, 6-toluene diisocyanate, 2,4'- and/or 4,4'-diphenylmethane diisocyanate, 1, 5-diisocyanato naphthalene and mixtures thereof. Aromatic polyisocyanates containing 3 or more isocyanate groups such as 4,4',4"-triphenylmethane triisocyanate and polymethylene poly(phenylisocyanates) obtained by phosgenating aniline/formaldehyde condensates may also be used.

It is more preferred that the polyisocyanates for the presently claimed invention are polymethylene poly (phenylisocyanate) compositions having a functionality of from about 2.1 to about 3.5, preferably 2.2 to 3.2 and most preferably of 2.3 to 2.8, and an NCO group content of about 26% to about 33.4%, preferably about 30.5% to about 33%, and a monomeric diisocyanate content of from about 20% to about 90% by weight, preferably from about 40% to about 80%, wherein the content of monomeric diisocyanate comprises up to about 5% by weight of the 2, 2'-isomer, from about 1 to about 25% by weight of the 2,4'-isomer, and from about 25 to about 70% by weight of the 4,4'-isomer, based on the entire weight of the isocyanate composition. The polymeric MDI content of these isocyanates varies from about 10 to about 80% by weight, preferably from about 20% to about 60% by weight.

Polymeric MDI as used herein, refers to polymethylene poly (phenyl-isocyanate) which in addition to monomeric diisocyanate (i.e., two-ring compounds) contains three-ring and higher ring containing products.

Most preferred polyisocyanates include, for example, polymethylene poly(phenylisocyanate) compositions having an average functionality of from about 2.2 to about 3.2, preferably about 2.3 to about 2.8, an NCO group content of about 30 to 33% by weight, and a monomer content of from about 40 to 80% by weight, wherein the content of monomer comprises no more than about 2% by weight of the 2,2'-isomer, from about 2 to about 25% by weight of the 2,4'-isomer and from about 35 to about 60% by weight of the 4,4'-isomer, based on the entire weight of the composition. This isocyanate composition comprises from about 20 to about 60% by weight of polymeric MDI.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Isocyanate prepolymers including, for example, those based on diphenylmethane diisocyanate which may be based on either polyethers or polyesters are suitable for the present invention. Although these are typically less preferred isocyanates, these are suitable for fertilizer encapsulation processes, particularly when a moisture curing, one component system is clesired. These compounds include, for example, an isocyanate-terminated prepolymer having an NCO content of about 10%, a functionality of about 2 and a viscosity of about 2,500 mPa.s at 25° C. Such prepolymers can be prepared by, for example, reacting 2,4'-isomer rich MDI with a difunctional polyether (prepared from propylene glycol and propylene oxide). A sulfur containing prepolymer can also be prepared by first dissolving the sulfur in the isocyanate followed by reaction with a suitable polyol to form the prepolymer.

Preferred isocyanates include, for example, cycloaliphatic diisocyanates which are preferably unmodified. Suitable cycloaliphatic diisocyanates include compounds such as, for example, 4,4'-dicyclo-hexylmethane diisocyanate and isophorone diisocyanate.

A most preferred polyisocyanate comprises a polymethylene poly-(phenylisocyanate) having an NCO content of about 32.4%, a functionality of about 2.5, a viscosity of about 57 mPa.s at 25° C., and having a monomer content of about 61% by weight. Of the 61% monomer, about 18.0% by weight is the 2,4'-isomer of MDI, about 2% by weight is the 2, 2'-isomer of MDI and about 41% is the 4,4'-isomer of MDI.

Another most preferred polyisocyanate component comprises a polymethylene poly(phenylisocyanate) having an NCO content of about 32.3%, a functionality of about 2.8, a viscosity of about 160 mPa.s at 25° C., and having a monomer content of about 45% by weight. Of the 45% by weight monomer, about 44% is the 4,4'-isomer of MDI and about 1% by weight is the 2,4'-isomer of MDI.

Diphenylmethane diisocyanate which is rich in the 2,4'-isomer is another most preferred isocyanate for the present invention. Specifically, diphenylmethane diisocyanate having an isomer distribution comprising about 44% by weight of the 4,4'-isomer, about 54% by weight of the 2,4'-isomer and about 2% by weight of the 2,2'-isomer. This diisocyanate has an NCO content of about 33.6%, a functionality of about 2.0 and a viscosity of less than about 25 mPa.s at 25° C.

The preparation of sulfur containing isocyanates is relatively simple. If only a small percentage (i.e., less than 2%) of sulfur is desired, powdered sulfur may be dissolved in the chosen isocyanate at room temperature by stirring or shaking or any other type of mixing. If higher amounts of sulfur are to be dissolved in the isocyanate, the measured amount of sulfur should be added to the isocyanate under agitation. The isocyanate should be heated up until the sulfur is dissolved. The solubility of sulfur in the isocyanate increases with increasing temperature.

In certain applications, it may be desirable to dissolve the sulfur in the isocyanate at elevated temperatures, but then store or use the isocyanate at ambient temperature. In this case, some of the dissolved sulfur may form a very fine solid suspension upon cooling. If stored under dry conditions, these suspensions of sulfur in isocyanate are stable for a long time, i.e., greater than 6 months, up to about 1 year. If the sulfur settles out on the bottom of a container, it can easily be redispersed by known techniques or redissolved by heating.

Whenever the isocyanate containing sulfur in either the suspended or dissolved form is reacted with an isocyanate-reactive compound such as, for example, a polyol, an amine, a mercaptan or water, the sulfur becomes a solid that is finely divided in the polyurethane and/or polyurea matrix.

For use in applications like vulcanization or the manufacturing of black powder, a sulfur containing isocyanate can be converted in a first step into a finely dispersed sulfur containing polymer which in a second step can be ground up in a powder. This powder can be used as an organic polymer modified sulfur or a sulfur modified polymer powder.

The sulfur containing isocyanate can also be reacted with suitable polyol, amino, or mercapto compounds on a substrate to form a coating or an encapsulant for a particulate material.

One of these applications is the encapsulation of fertilizer where the resulting sulfur containing polyurethane and/or polyurea does not only provide abrasion resistance and slow release properties, but the sulfur also represents a micronutrient source for the plants for which the fertilizer is used.

Sulfur is biodegradable and can be converted in a weaker soluble form by oxidative and reductive processes. Thus, the sulfur containing isocyanates can be used in biodegradable formulations. Biodegradation, however, also depends on which isocyanates and polyols or amines were chosen to form the polymer. Polyureas formed from aromatic isocyanates and amines, for example, have been found to be non-biodegradable.

The sulfur containing isocyanates according to the present invention are prepared by dissolving the desired amount of sulfur, preferably at elevated temperature (i.e., between 90 and 140° C.) in the isocyanate of choice.

The sulfur containing isocyanate compositions can be subsequently reacted with isocyanate-reactive compounds such as, for example, glycols, polyether- or polyester-polyols, primary or secondary diamines or polyamines, amine-terminated polyols, etc.

Catalysts known in polyurethane chemistry may be added to accelerate the reaction between isocyanates and the isocyanate-reactive compounds.

Inorganic fillers may also be used in the present invention. Some examples of suitable inorganic fillers include talc, calcium carbonate, etc.

The samples for FIGS. 1, 2 and 3 were prepared as follows. Prior to examination by SEM, the fertilizer pellets were embedded in an epoxy resin matrix and cut with an RMC MT-7000 ultra-microtome to obtain a cross-section. A glass knife was used to remove two micron thick slices until a suitable cross-section of the epoxy embedded pellet was exposed. The samples were then examined with a Hitachi S-2460N scanning electron microscope in the variable pressure mode. The accelerating voltage was 15kV, the pressure was 20 Pa, and the working distance was 16 mm.

FIG. 1 is a scanning electron micrograph (SEM), 500 magnification, of a cross-section of an encapsulated fertilizer particle produced in accordance with the present invention. The SEM picture shows the fertilizer 4 inside surrounded by the sulfur containing polyurethane encapsulation layer 6. The outside shows the epoxy resin matrix 2 used in the preparation process. Within the layer of polyurethane, the sulfur formed relatively small, finely dispersed particles 10 that were, for example, about 2 μm in diameter.

Figure 2:
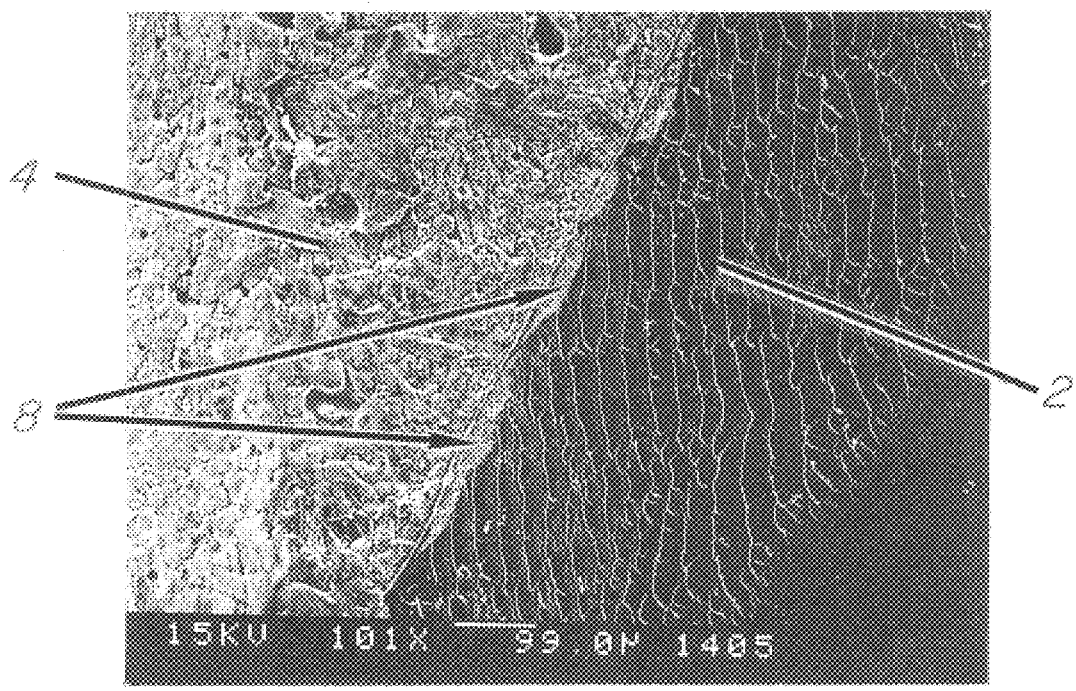
FIG. 2 is a scanning electron micrograph (101 magnification) of a cross-sectional view of a prior art encapsulated fertilizer particle wherein sulfur was applied as a liquid to the surface of the fertilizer particle.

FIG. 2 is a scanning electron micrograph (SEM) of a cross-section of prior art encapsulated fertilizer particle wherein sulfur was applied as a liquid to the surface of the fertilizer particle 4. This resulted in big chunks of sulfur 8 on the fertilizer surface, the chunks being from, for example, 20 to 30 μm thick and sometimes over 200 μm in length. The liquid sulfur did not completely cover the fertilizer particles. The outside shows the epoxy resin matrix 2 used in the preparation process.

Figure 3:
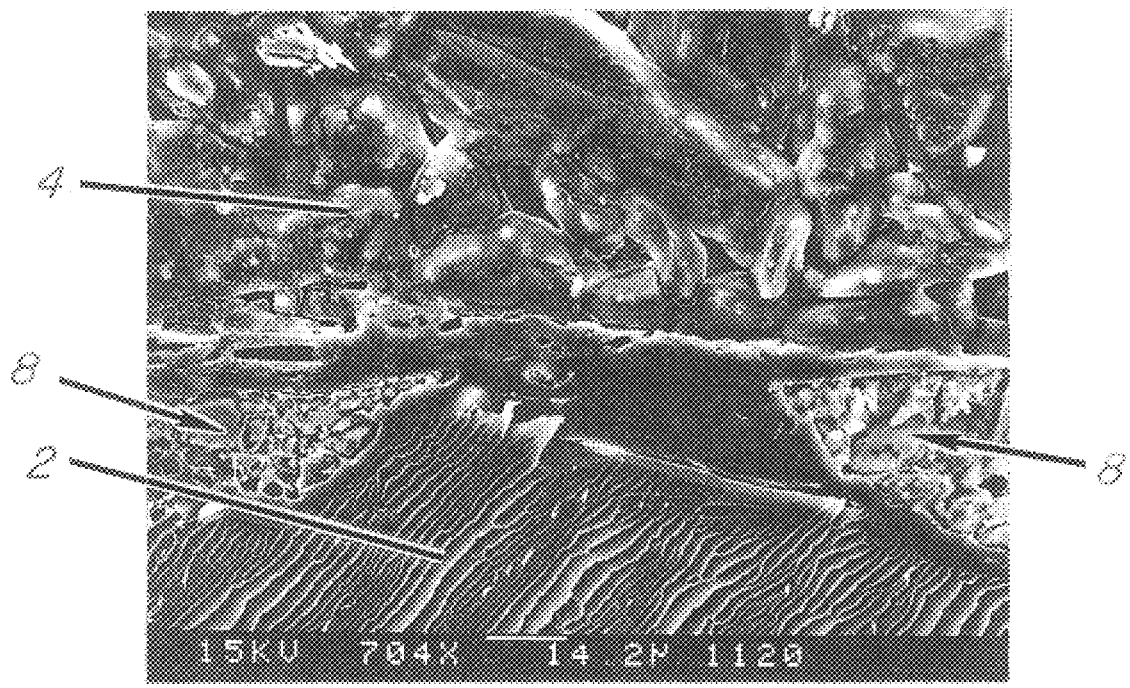
FIG. 3 is a scanning electron micrograph of increased magnification (704 magnification) of the same cross-sectional view of the prior art encapsulated fertilizer particle in FIG. 2.

FIG. 3 is a scanning electron micrograph (SEM) of increased magnification of a cross-section of the prior art encapsulated fertilizer particle from FIG. 2, wherein sulfur was applied as a liquid to the surface of the fertilizer particle. This resulted in chunks of sulfur 8 on the fertilizer particle 4. The liquid sulfur did not completely cover the fertilizer particles. The magnification clearly shows that there are surface areas on the fertilizer 4 that are not covered with sulfur 8. The outside shows the epoxy resin matrix 2 used in the preparation process.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples:

ISO A: a polymethylene poly(phenylisocyanate) having an NCO content of about 32.4%, a functionality of about 2.5, a viscosity of about 57 mPa.s at 25° C., and having a monomer content of about 61% by weight. Of the 61% monomer, about 18.0% by weight is the 2,4'-isomer of MDI, about 1.8% by weight is the 2,2'-isomer of MDI and the balance is the 4,4'-isomer of MDI.

ISO B: diphenylmethane diisocyanate having an NCO content of about 33.6%, a functionality of about 2.0 and a viscosity of less than about 25 mPa.s at 25° C., and having an isomer distribution of 44% by weight of the 4,4'-isomer, 54% by weight of the 2,4'-isomer and about 2% by weight of the 2, 2'-isomer.

ISO C: an isocyanate-terminated prepolymer having an NCO content of about 10%, a functionality of about 2 and a viscosity of about 2,500 mPa.s at 250° C. This prepolymer was prepared by reacting i) 100 parts by weight of distilled 2,4'-isomer rich MDI having an NCO content of about 33.6%, a functionality of 2.0, a viscosity of less than 25 mPa.s at 25° C., and having an isomer distribution of about 44% by wt. of the 4,4'-isomer, 54% by wt. of the 2,4'-isomer and 2% by wt. of the 2,2'-isomer; with ii) about 166 parts by weight of a 2000 molecular weight difunctional polyether (prepared from propylene glycol and propylene oxide). The isocyanate and polyol were reacted with agitation under a dry nitrogen atmosphere for 2 hours at 80° C., and the resulting prepolymer was cooled to room temperature and stored under a dry nitrogen blanket.

ISO D: 4,4'-dicyclohexylmethane diisocyanate having the following isomer distribution: about 17 to 24% by wt. of the trans,trans isomer, about 25 to 32% by wt. of the cis,trans-isomer and 47 to 54% by wt. of the cis,cis-isomer (with the %'s by wt. totaling 100%).

Sulfur: Precipitated sulfur, powder, commercially available from Fisher Scientific.

The solubility of sulfur in these isocyanates was determined according to the following procedure:

The sulfur solubility was determined by placing the desired isocyanate/sulfur mixture in a 250 ml three-neck, round bottom flask fitted with a thermometer and motor driven stirrer. This flask was placed into a 1000 ml beaker containing silicon oil which was in turn heated by a heating tape wound around the beaker. The silicon oil was stirred with a magnetic stirring bar. The heating was controlled with a Cole Palmer "Digi-Sense" temperature controller. The flask, beaker and heating mantle were placed on a magnetic stirrer.

To simplify the process, a small amount of sulfur was used for the first measurement, then sulfur was added to the mixture to obtain subsequent measurements at higher concentrations.

The mixture was heated until the sulfur was completely dissolved; time the temperature on the controller was lowered by two steps and the solution was observed using a laser beam (Radio Shack LX 1000 pointer) to determine precipitation. In many cases, the precipitation could be determined directly by visual observation. The temperture when sulfur is completely dissolved, as used herein, is defined as one degree above the temperature at which sulfur was observed to precipitate from the solution during slow cooling.

TABLE 1

Solubility of Sulfur in ISO A

| Temperature, (° C.) | Sulfur (% by wt.) |
|---|---|
| 32 | 1.90 |
| 44 | 2.68 |
| 59 | 3.94 |
| 70 | 5.50 |
| 90 | 7.94 |
| 106 | 12.09 |
| 139 | 20.33 |

TABLE 2

Solubility of Sulfur in ISO B

| Temperature, (° C.) | Sulfur (% by wt.) |
|---|---|
| 37 | 2.08 |
| 77 | 6.16 |
| 96 | 9.83 |
| 105 | 13.14 |
| 123 | 20.03 |

TABLE 3

Solubility of Sulfur in ISO C

| Temperature, (° C.) | Sulfur (% by wt.) |
|---|---|
| 57 | 1.02 |
| 80 | 2.09 |
| 95 | 3.06 |
| 101 | 4.02 |
| 107 | 4.98 |

TABLE 4

Solubility of Sulfur in ISO D

| Temperature, (° C.) | Sulfur (% by wt.) |
|---|---|
| 39 | 1.39 |
| 43 | 1.69 |
| 60 | 2.58 |
| 74 | 3.97 |
| 85 | 5.08 |
| 94 | 6.87 |
| 102 | 9.02 |
| 112 | 11.69 |
| 128 | 13.89 |
| 143 | 16.59 | procedure 1

ISO A was added to fertilizer pellets in an 8 oz. jar and mixed by shaking and rolling for about 2 minutes. Next, DEG (diethylene glycol) was added to the jar containing the isocyanate coated fertilizer pellets and mixed for about 2 minutes. These pellets were poured into an aluminum tray and placed in a 110° C. oven and mixed using a spatula about 2 or 3 times until the pellets were no longer tacky (i.e., about 15 to 20 minutes). This coating procedure above was repeated 2 more times, using these pellets.

The following formulation was used for each coating procedure in

Examples 4 and 8

|  | Grams |
|---|---|
| Fertilizer | 100 |
| ISO A | 1.56 |
| DEG | 0.57 |

The total amount of polyurethane coated on the fertilizer surface was 5.29% by weight (based on the total weight of the coated fertilizer particles).

Procedure 2

The same procedure as described for Example 1 was used. In this example, an isocyanate component containing 10% by weight sulfur and 90% by weight of ISO A was substituted for ISO A. The formulation for Examples 2, 3, 6 and 7 was as follows:

|  | Grams |
|---|---|
| Fertilizer | 100 |
| ISO A (90%)/Sulfur (10%) | 1.6 |
| DEG | 0.53 |

The total amount of polyurethane coated on the fertilizer surface was 5.29% by weight (based on the total weight of the coated fertilizer particles).

Example 1

The uncoated 5-10-10 fertilizer which was used as the control in determining the fertilizer release properties.

Example 2

In accordance with Procedure 2, a sulfur containing isocyanate was prepared by dissolving the sulfur in the isocyanate at 110° C., and then applying this to 5-10-10 fertilizer pellets which were preheated to 110° C. The DEG which was also preheated to 110° C. was subsequently mixed with the isocyanate/sulfur coated fertilizer pellets.

Example 3

In accordance with Procedure 2, a sulfur containing isocyanate was prepared by dissolving the sulfur in the isocyanate at 110° C., and then cooling the isocyanate to 25° C. At this temperature, part of the sulfur remained dissolved in the isocyanate, another part became solid and remained finely dispersed in the isocyanate. This isocyanate was applied to the 5-10-10 fertilizer pellets at 25° C., followed by the DEG which was also applied at 25° C. The reaction between the isocyanate and DEG was completed at 110° C. according to Procedure 1.

Example 4 (comparison)

In accordance with Procedure 1, the isocyanate was applied to the 5-10-10 fertilizer pellets which were preheated to 110° C. This isocyanate did not contain sulfur. The DEG which was also preheated to 110° C. was subsequently mixed with the isocyanate coated fertilizer pellets.

Example 5

The uncoated urea fertilizer which was used as the control in determining the fertilizer release properties.

Example 6

In accordance with Procedure 2, a sulfur containing isocyanate was prepared by dissolving the sulfur in the isocyanate at 110° C., and then applying this to urea fertilizer pellets which were preheated to 110° C. The DEG which was also preheated to 110° C. was subsequently mixed with the isocyanate/sulfur coated fertilizer pellets.

Example 7

In accordance with Procedure 2, a sulfur containing isocyanate was prepared by dissolving the sulfur in the isocyanate at 110° C., and then cooling the isocyanate to 25° C. At this temperature, part of the sulfur remained dissolved in the isocyanate, another part became solid and remained finely dispersed in the isocyanate. This isocyanate was applied to the urea fertilizer pellets at 25° C., followed by the DEG which was also applied at 25° C. The reaction between the isocyanate and DEG was completed at 110° C. according to Procedure 1.

Example 8 (comparison)

In accordance with Procedure 1, the isocyanate was applied to the urea fertilizer pellets which were preheated to 110° C. This isocyanate did not contain sulfur. The DEG which was also preheated to 110° C. was subsequently mixed with the isocyanate coated fertilizer pellets.

The polyurethane encapsulated fertilizer granules of Examples 1–8 were tested for slow release properties using the following test procedure:

20 g. of fertilizer granules from each example were combined with 80 g. of water and stored at room temperature in a closed jar for about 8 hours. After this time, the solids were filtered off and the amount of solids in the aqueous phase was determined after evaporation of water for 4 hours in a 100° C. oven.

All encapsulated products show much slower release when compared with the non-treated standard untreated fertilizer. Comparing the release of fertilizer encapsulated at 25° C. which contain sulfur in the isocyanate (i.e., Examples 3 and 7) vs. the products containing no sulfur (i.e., Examples 4 and 8) clearly demonstrates the favorable slower release of products containing sulfur incorporated (at the same percentage of polyurethane encapsulation or coating). The encapsulation data for the examples is set forth in Table 5 below.

TABLE 5

Encapsulation Data for Examples 1 and 2

| Example | Coating | Fertilizer | % Encapsulated | Temperature (° C.) of Raw Materials and Fertilizer | 8 Hr. Storage; % Fertilizer Dissolved* |
|---|---|---|---|---|---|
| 1 | Uncoated | 5-10-10 | 0 | — | 32.5 |
| 2 | ISO A/Sulfur/ DEG | 5-10-10 | 5.29 | 110 | 23.2 |
| 3 | ISO A/Sulfur/ DEG | 5-10-10 | 5.29 | 25 | 10.4 |
| 4 | ISO A/DEG | 5-10-10 | 5.29 | 25 | 13.7 |
| 5 | Uncoated | urea | 0 | — | 94.2 |
| 6 | ISO A/Sulfur/ DEG | urea | 5.29 | 110 | 44.4 |
| 7 | ISO A/Sulfur/ DEG | urea | 5.29 | 25 | 27.0 |
| 8 | ISO A/DEG | urea | 5.29 | 25 | 39.9 |

*in distilled water

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an encapsulated, slow release fertilizer composition comprising:
   1) applying an isocyanate composition to fertilizer particles which contain at least one water soluble plant nutrient to form isocyanate coated fertilizer particles, wherein said isocyanate composition comprises an aromatic di- or polyisocyanate containing from 1 to 50% by weight of sulfur, based on 100% by weight of isocyanate,
   2) applying an isocyanate-reactive composition which contains at least two isocyanate-reactive groups to the isocyanate coated fertilizer particles from step 1) to yield polyurethane and/or polyurea encapsulated fertilizer particles, and optionally,
   3) repeating steps 1) through 2) as many times as necessary, wherein the encapsulated fertilizer particles from step 2) are substituted for the fertilizer particles in step 1) above,
   thereby forming encapsulated fertilizer particles which contain from about 2% to about 20% by weight of polyurethane and/or polyurea, based on the total weight of the encapsulated fertilizer particles.

2. The process of claim 1, wherein said isocyanate-reactive composition is selected from the group consisting of (i) a compound that contains at least two amine groups, (ii) a compound that contains at least two hydroxyl groups, (iii) water and (iv) mixtures thereof.

3. The process of claim 1, wherein said aromatic polyisocyanate comprises polymethylene poly (phenylisocyanate) having an NCO group content of about 26 to about 34%, a functionality of about 2.1 to about 3.5, a polymeric isocyanate content of about 10 to about 80% by weight and a monomeric diisocyanate content of about 20 to about 90% by weight, wherein the monomer comprises about 25 to 70% by weight of the 4,4'-isomer, from about 1 to 25% by weight of the 2,4'-isomer and up to about 5% by weight of the 2,2'-isomer.

4. The polyurethane and/or polyurea encapsulated, slow release fertilizer particles produced by the process of claim 1.

5. A process for the production of an encapsulated, slow release fertilizer composition comprising:
   1) applying an isocyanate-reactive composition which contains at least two isocyanate-reactive groups to fertilizer particles containing at least one water soluble plant nutrient to form fertilizer particles coated with an isocyanate-reactive component,
   2) applying an isocyanate composition onto the coated fertilizer particles from step 1) to yield polyurethane and/or polyurea encapsulated fertilizer particles, wherein said isocyanate composition comprises an aromatic di- or polyisocvanate containing from 1 to 50% by weight of sulfur, based on 100% by weight of isocyanate, and, optionally,
   3) repeating steps 1) through 2) as many times as necessary, wherein the encapsulated fertilizer particles from step 2) are substituted for the fertilizer particles in step 1) above,
   thereby forming encapsulated fertilizer particles which contain from about 2% to about 20% by weight of polyurethane and/or polyurea, based on the total weight of the encapsulated fertilizer particles.

6. The process of claim 5, wherein said isocyanate-reactive composition is selected from the group consisting of (i) a compound that contains at least two amine groups, (ii) a compound that contains at least two hydroxyl groups, (iii) water and (iv) mixtures thereof.

7. The process of claim 5, wherein said aromatic polyisocyanate comprises polymethylene poly (phenylisocyanate) having an NCO group content of about 26 to 34%, a functionality of about 2.1 to about 3.5, a polymeric isocyanate content of about 10 to 80% and a monomeric diisocyanate content of about 20 to 90% by weight, wherein the monomer content comprises about 25 to 70% by weight of the 4,4'-isomer, about 1 to 25% by weight of the 2,4'-isomer, and up to 5% by weight of the 2,2'-isomer.

8. The polyurethane and/or polyurea encapsulated, slow release fertilizer particles produced by the process of claim 5.

9. A process for the production of an encapsulated, slow release fertilizer composition comprising:
   1) pre-mixing an isocyanate composition, and an isocyanate-reactive composition which contains at least two isocyanate-reactive groups, wherein said isocyanate composition comprises an aromatic di- or polyisocyanate containing from 1 to 50% by weight of sulfur, based on 100% by weight of isocyanate;

2) applying the mixture from step 1) to fertilizer particles which contain at least one water soluble plant nutrient to form polyurethane and/or polyurea encapsulated fertilizer particles, and, optionally, 3) repeating step 2) as many times as necessary, thereby forming encapsulated fertilizer particles which contain from about 2% to about 20% by weight of polurethane and/or polyurea, based on the total weight of the encapsulated fertilizer particles.

10. The process of claim 9, wherein said isocyanate-reactive composition is selected from the group consisting of (i) a compound that contains at least two amine groups, (ii) a compound that contains at least two hydroxyl groups, (iii) water and (iv) mixtures thereof.

11. The process of claim 9, wherein said aromatic polyisocyanate comprises polymethylene poly(phenylisocyanate) having an NCO group content of about 26 to 34%, a functionality of about 2.1 to about 3.5, a polymeric isocyanate content of about 10 to 80% and a monomeric diisocyanate content of about 20 to 90% by weight, wherein the monomer content comprises about 25 to 70 by weight of the 4,4'-isomer, about 1 to 25% by weight of the 2,4'-isomer, and up to 5% by weight of the 2,2'-isomer.

12. The polyurethane and/or polyurea encapsulated, slow release fertilizer particles produced by the process of claim 9.

* * * * *